United States Patent [19]

Krings et al.

[11] Patent Number: 5,275,845
[45] Date of Patent: Jan. 4, 1994

[54] METHOD OF PRETREATING CONNECTING ELEMENTS OF A GAS-TIGHT SLEEVE-TYPE PIPE CONNECTION

[75] Inventors: Reiner Krings, Düsseldorf; Hansjoachim Nimtschek, Moers-Kapellen, both of Fed. Rep. of Germany

[73] Assignee: Mannesmann Aktiengesellschaft, Corp., of Germany, Düsseldorf

[21] Appl. No.: 904,058

[22] Filed: Jun. 24, 1992

[30] Foreign Application Priority Data

Jun. 26, 1991 [DE] Fed. Rep. of Germany ....... 4121488

[51] Int. Cl.⁵ .................... B05D 5/08; B05D 7/22; C10M 113/08; C10M 125/22; C10M 125/22
[52] U.S. Cl. .................... 427/239; 427/327; 252/25; 252/28
[58] Field of Search .............. 285/94; 29/458; 252/25, 252/28; 427/327, 239

[56] References Cited

U.S. PATENT DOCUMENTS

| | | | |
|---|---|---|---|
| 2,412,929 | 12/1946 | Bogart et al. | 252/28 |
| 3,309,313 | 3/1967 | Callahan | 252/28 X |
| 4,755,308 | 7/1988 | Holinski et al. | 252/28 X |
| 5,069,761 | 12/1991 | Krings et al. | 427/239 X |

FOREIGN PATENT DOCUMENTS

3913314 10/1990 Fed. Rep. of Germany.

OTHER PUBLICATIONS

Boner, C. J., "Manufacture and Application of Lubricating Greases", Robert E. Krieger Publishing Co., Inc. Huntington, N.Y., 1971, pp. 175, 783 and 793.

*Primary Examiner*—W. J. Shine
*Assistant Examiner*—Douglas J. McGinty
*Attorney, Agent, or Firm*—Cohen, Pontani, Lieberman, Pavan

[57] ABSTRACT

A method of pretreating the connecting elements of a gas-tight sleeve-type pipe connection which includes a tight metal seat and abutting joint shoulders. The connection is effected by screwing threaded pipe ends into a sleeve having threaded portions. The pipes are of high-alloy steel and the connecting elements are of austenitic steels with chromium and nickel contents of greater than 20% by weight and molybdenum contents of greater than 2.5% by weight, as well as austenitic materials with nickel contents of greater than 50% and chromium and molybdenum contents of greater than 10% by weight. The connecting elements of the sleeve are coated with a metal layer. The method includes cleaning the connecting elements and subsequently applying as a lubricant on the connecting elements a metal-free, ceramic-based paste whose principal components are silicates, titanium oxide, and zinc sulfide as solid components, as well as vegetable oils and white oils.

3 Claims, 1 Drawing Sheet

METHOD OF PRETREATING CONNECTING ELEMENTS OF A GAS-TIGHT SLEEVE-TYPE PIPE CONNECTION

BACKGROUND OF THE INVENTION

1. Field of the Invention

The present invention relates to a method of pretreating the connecting elements of a gas-tight sleeve-type pipe connection with a tight metal seat and joint shoulders between the pipes to be connected and the sleeve. The pipes are casing or tubing pipes which are made of high-alloy steel and are used in the crude oil and natural gas industries. The method includes coating the sealing and threaded portions of the sleeve with a metal and, prior to screwing the pipes into the sleeve, applying a lubricant on the cleaned sealing and threaded portions of the connecting elements.

2. Description of the Related Art

A pipe connection of a pipeline composed of threaded pipes which can be screwed together and are used in the crude oil and natural gas industries has the purpose, on the one hand, to absorb the load acting on the pipeline and, on the other hand, to ensure the tightness of the connection. For meeting these objects, threaded portions at the ends of the pipes and of the sleeve have, for example, a conical API thread with an appropriate overlap. When the pipes and sleeve are screwed together, this overlap causes high contact pressures. For handling these high loads, surface coating and greases have been developed which make it possible to effect the screw connections without seizing. These thread greases are pastes with lubricating power which have a high content of finely distributed solid particles, such as graphite, metals, or Teflon. In addition to making it easier to screw the pipes and sleeve together, these greases reinforce the hydraulic tightness in the threaded areas of the connection.

In gas-tight sleeve-type pipe connections developed by various manufacturers, the tightness is obtained usually by high contact pressures as a result of an overlap in the tight metal seat.

The joint shoulders have the purpose of serving as stop means for the screw connection and ensure that the tight metal seat remains activated even when the load acting on the pipeline increases. Consequently, the conical thread does not have to perform a sealing function and, contrary to API round and buttress threads, the thread only has the purpose of transmitting the load in the pipeline. In order to be able to reliably screw gas-tight connections together in the threaded and tight-seat areas, in pipe connections in which the pipes are made of unalloyed and middle-alloy carbon steels, an application of phosphate is used almost exclusively as the surface treatment and standardized solid lubrication pastes, such as API grease, are used in order to eliminate seizing phenomena and to make it possible that the screw connections can be used several times.

However, the above-described method cannot be used in high-alloy austenitic steels having nickel and chromium contents of more than 20% by weight and molybdenum content of more than 2.5% by weight.

A known possibility of ensuring that the screw connection can be effected several times in austenitic steels is the implantation of ions in the sealing and threaded areas of the sleeve. In this method, ionized metals, such as palladium, silver, chromium, or gold, penetrate into the surface of the sleeve. After this pretreatment has been carried out, a standardized API grease is applied as a lubricant before the screw connection is made. This expensive pretreatment is only possible in a specialized establishment and poses logistic difficulties for the user and may mean that the user is dependent on a single supplier.

SUMMARY OF THE INVENTION

Therefore, it is the object of the present invention to provide a simple pretreatment of the connecting elements of a gas-tight sleeve-type pipe connection which can be carried out reproducibly several times in high-alloy austenitic steels and austenitic materials based on nickel.

In accordance with the present invention, connecting elements of austenitic steels with chromium and nickel contents greater than 20% by weight and molybdenum contents of greater than 2.5% by weight and of austenitic materials with nickel contents of greater than 50% by weight and chromium and molybdenum contents of greater than 10% by weight are pretreated by applying, prior to screwing the connection together, a metal-free, ceramic-based paste as lubricant onto the sleeve and onto the blank pipe ends of the pipes to be connected, wherein the principal components of the paste are silicates, titanium oxide, and zinc sulfide as solid components, as well as vegetable oils and white oils.

The metal-free paste referred to above is known and is manufactured by Metallit GmbH. As mentioned above, the principal components of this paste are vegetable oils and white oils, as well as silicates, titanium oxide, and zinc sulfide as solid components. This lubricant is virtually not affected by changes in temperature and is extremely resistant to high pressures and has the additional advantage that it is not injurious to health.

Tests have shown that the method according to the present invention is particularly effective if the sealing and threaded areas of the sleeve are coated with copper in the known manner and the pipe ends of the pipes to be connected remain blank or uncoated. Furthermore, when carrying out the screw connection repeatedly up to ten times, it was found that, contrary to conventional expectations, the screw pattern became even better after several screw connections. The reason for this is believed to be the fact that the ceramic pastes act similar to a polishing paste and flatten the microscopically small unevenness of the thread surfaces and sides.

Another advantage of the use of this ceramic paste as lubricant for pipe connections is to be seen in the fact that the paste is not harmful to health. For this reason, it is not necessary to provide protective measures for the operating personnel on the derrick. In addition, this paste is especially suitable for geothermal drillings in spas because, since the brine which is produced is used for medicinal purposes in humans, this brine may not be contaminated by oils or greases and may not contain any metals or metal compounds which may be harmful to health. Thus, in this field of application, the present invention is not limited to high-alloy austenitic steels but is also applicable, for example, in 13% chromium steels and carbon steels.

Another advantage of the use of the ceramic paste according to the present invention as a lubricant for screwed pipe connections is the resistance to high temperatures of up to 1,000° C. of the ceramic paste. The conventionally used lubricants, such as API grease and greases based on Teflon, only have a resistance to temperatures of up to 130°-150° C. This means that, when these temperatures are exceeded for long periods of time, the lubricant decomposes and loses its lubricating effect.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there is illustrated and described a preferred embodiment of the invention.

DESCRIPTION OF THE PREFERRED EMBODIMENTS

Figure 1A:
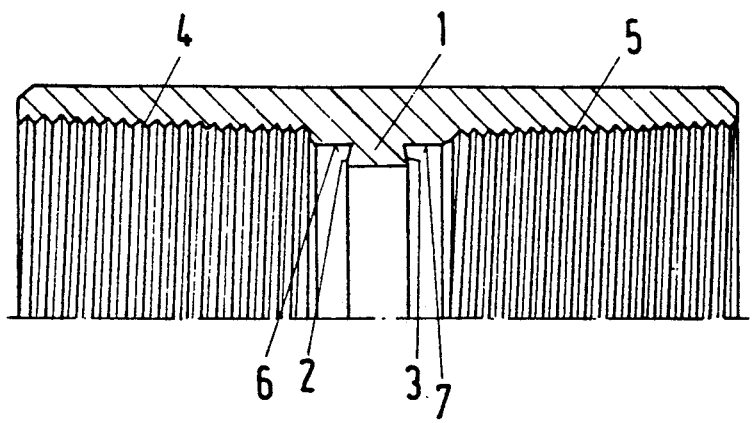
FIG. 1a is a partial longitudinal sectional view of a pretreated sleeve.

FIG. 1a of the drawing is a partial longitudinal sectional view of the pretreated sleeve 1. After a chemical pretreatment, not illustrated in detail, the tight seat areas 6, 7, both joint shoulders 2, 3, and both threaded portions 4, 5 are coated with a thin layer of copper.

Figure 1B:
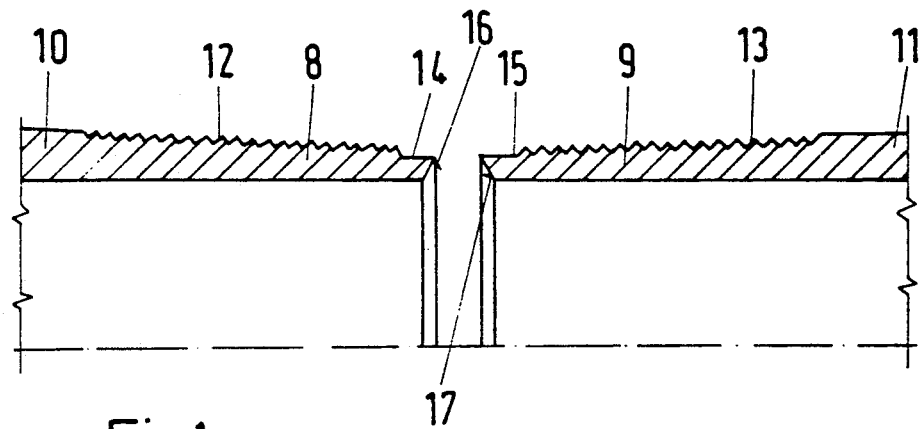
FIG. 1b is a partial longitudinal sectional view of the untreated pipe ends.

The pipe ends 8, 9 constructed as connecting elements of the two pipes 10, 11 to be connected remain untreated and blank or uncoated, as shown in FIG. 1b. Each pipe end element 8, 9 has a threaded portion 12, 13, a tight seat surface 14, 15, and a joint shoulder 16, 17.

Before the pipe connection is screwed together, the sleeve as well as the pipe ends 8, 9 are completely cleaned and, subsequently, the ceramic-based paste is applied by means of a brush onto all connecting elements.

Figure 1C:
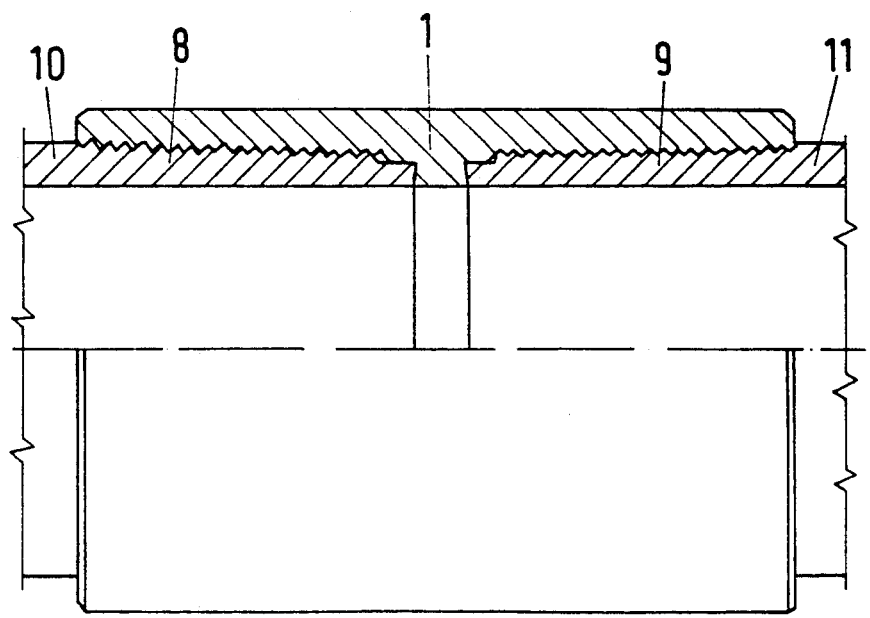
FIG. 1c shows, partially in a sectional and partially in an elevational view, the pipe connection in the screwed-together state.

FIG. 1c of the drawing shows the pipe connection in the screwed-together state, wherein the sealing surfaces 14, 15 of the pipe end elements 8, 9 form a tight metal seat together with the sealing surfaces 6, 7 of the sleeve 1. The threaded portions 4, 5 and 12, 13 are constructed so as to be complementary conical relative to each other. The selected type of thread of the threaded portions 4, 12, 13 is of minor significance for the method of the present invention.

It should be understood that the preferred embodiments and examples described are for illustrative purposes only and are not to be construed as limiting the scope of the present invention which is properly delineated only in the appended claims.

We claim:

1. A method of pretreating connecting elements in a gas-tight sleeve-type pipe connection in which two threaded pipe ends as the connecting elements are screwed into threaded portions of a sleeve, wherein the sleeve and the pipe ends define a tight metal seat and have abutting joint shoulders, and wherein the threaded portion, the tight metal seat portion, and the joint shoulder of the sleeve are provided with a coating of metal, the pipe ends and the sleeve being of austenitic steel with chromium and nickel contents of greater than 20% by weight and molybdenum contents of greater than 2.5% by weight and of austenitic materials with nickel contents of greater than 50% by weight and chromium and molybdenum contents of greater than 10% by weight, the method comprising, prior to screwing the threaded pipe ends into the sleeve, cleaning the threaded pipe ends and the threaded portions of the sleeve, the tight metal seat portions, and the abutting joint shoulders and subsequently applying on the threaded pipe ends and the threaded portions of the sleeve, the tight metal seat portions, and the abutting joint shoulders a metal-free ceramic-based paste as a lubricant consisting essentially of silicates, titanium oxide, and zinc sulfide as solid components, as well as vegetable oils and white oils.

2. The method according to claim 1, wherein the threaded portion, the tight metal seat portion, and the joint shoulder of the sleeve are provided with a coating of copper.

3. A method of pretreating a gas-tight sleeve-type pipe connection in which two threaded pipe ends are screwed into threaded portions of a sleeve, wherein the pipe ends and the sleeve have connecting elements which engage each other, and wherein the connecting elements of the sleeve are provided with a coating of metal, the method comprising cleaning the connecting elements of the pipe ends and of the sleeve and subsequently applying as lubricant on the connecting elements a metal-free, ceramic-based paste consisting essentially of silicates, titanium oxide, and zinc sulfide as solid components, as well as vegetable oils and white oils.

* * * * *